No. 864,985. PATENTED SEPT. 3, 1907.
A. P. OLSON.
BUFFER.
APPLICATION FILED DEC. 19, 1906.

Witnesses:
R. J. Jacker
Inga E. Olson.

Inventor:
Andrew P. Olson
By Jno. H. Whipple
Atty.

THE NORRIS PETERS CO., WASHINGTON, D. C.

UNITED STATES PATENT OFFICE.

ANDREW P. OLSON, OF CHICAGO, ILLINOIS.

BUFFER.

No. 864,985.        Specification of Letters Patent.        Patented Sept. 3, 1907.

Application filed December 19, 1906. Serial No. 348,552.

*To all whom it may concern:*

Be it known that I, ANDREW P. OLSON, of Chicago, in the State of Illinois, have invented certain new and useful Improvements in Buffers, of which the following is a specification.

My invention relates to buffers for automobile vehicles or the like; and the objects of my improvements are, first, to provide a buffer-bar having rearwardly curved ends adapted to shield the front wheels of the vehicle; second to provide spring or yielding connections for attaching the buffer-bar to the frame of the vehicle; and, third, to afford facilities for the proper compensating movements of the buffer-bar backward and endwise in action as when in collision with an opposing body striking it at any point along its length either squarely or oblique. I attain these objects by the means illustrated in the accompanying drawing, in which—

Figure 1:
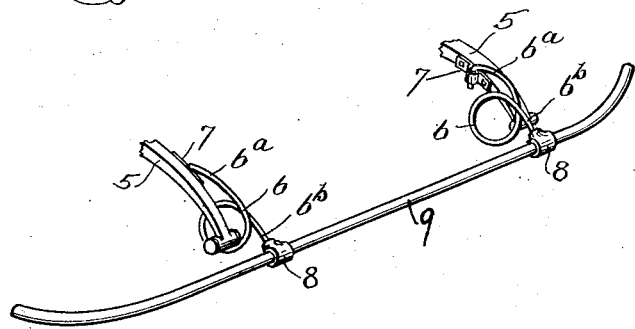
Figure 2:
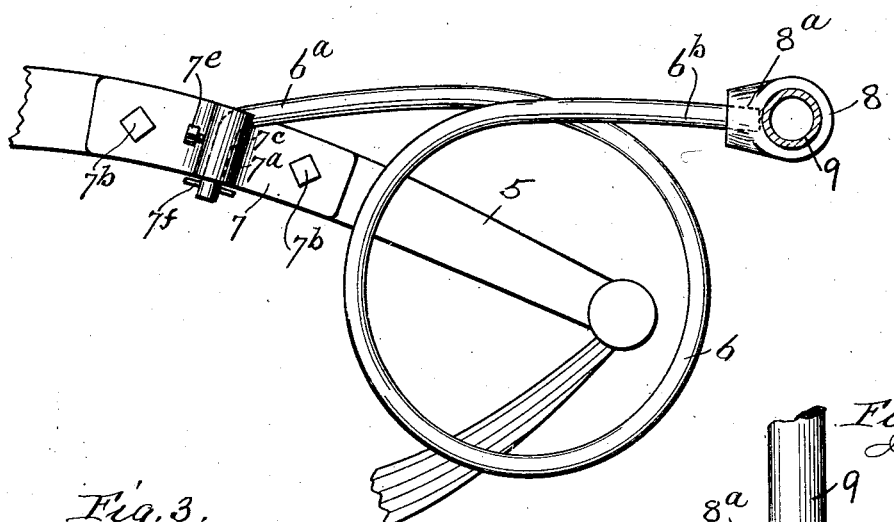
Figure 3:
Figure 4:
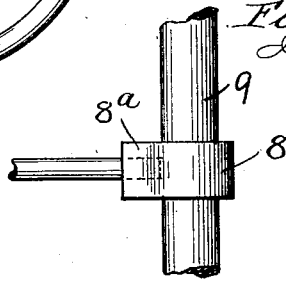

Figure 1 is a perspective view showing a buffer containing my invention as applied to the side members of the frame of an automobile as ordinarily constructed, portions of the front end only of such side members being shown. Fig. 2 is a comparatively enlarged view, showing an end portion of one of the side members of the frame and one of the spring-connections in side elevation. Fig. 3 is a detail showing, in top or plan perspective, a fastening-piece for attaching one end of the spring to the frame side member. Fig. 4 is a detail showing a plan or top view of a fastening-piece for attaching the other end of the spring to the buffer-bar.

In the drawings the numeral 5 designates the side members of the vehicle frame which are shown in fragment only. Ordinarily these are arranged at the sides of and under the box or bed of the vehicle (not shown) and extended forward between the front wheels, (also not shown).

The numeral 6 designates the buffer-springs consisting of a loop or coil of tempered steel wire or rod having one end $6^a$ extended from the coil rearwardly and preferably bent downwardly, and the other end $6^b$ extended forwardly.

Fastening-pieces 7 each provided with a lug $7^a$ and bolt-holes for bolts $7^b$, are made to serve the purpose of attaching the rear ends of the buffer-springs to the frame members 5. The lugs are perforated or provided with eyes from the top side downwardly and preferably clear through as shown by dotted lines at $7^c$ (Fig. 2) the top at the front side being grooved as shown at $7^d$ (Fig. 3) from the eye to the front edge so that when the downwardly-bent rear end of the buffer-spring bar is inserted in the eye the adjacent horizontal part will fall into the groove and form a laterally rigid connection of the spring to the vehicle.

The fastening-piece 8 for attaching the front end of the spring to the buffer-bar 9 consists of a ring adapted to slip over the bar tightly when forced or shrunk on, so as to hold it in position in front of the vehicle wheels. The rings have a thickened or extended side $8^a$ in which holes or eyes are made for forcibly inserting the front ends of the buffer-springs under sufficient pressure to keep them in place.

The fastening-pieces 7 being secured to the frame pieces 5, the parts of the bent down rear ends of the springs are secured in the eyes thereof by means of set screws $7^e$ or pins $7^f$, the parts $6^a$ being sprung outwardly to stand clear of the central loop or coil. The front parts $6^b$ are forced into the eyes of the fastening pieces 8 or otherwise secured therein to form a laterally rigid connection between the springs and buffer-bar.

The buffer bar 9 is of the requisite length to span the roadway traversed by the vehicle, and preferably has its ends, which project outside the buffer springs 6, curved as illustrated in the drawings, the curves extending backward, or towards the front ends of the side members of the frame, the purpose being to shunt or deflect from the path of the vehicle any light opposing vehicle or object coming in contact with the curved part.

The buffer constructed and connected to the vehicle frame as shown and described operates as follows. Being brought into contact with a resisting body striking squarely at or near the mid-length of the buffer-bar its yield backwardly is substantially equal at both ends of the bar. If the shock is oblique to the line of the bar, a slight endwise movement of the bar is also afforded, and when relieved, the springs will cause the bar to resume its normal position relatively to the vehicle. The endwise movement of the bar compensates for lateral movement or sliding sidewise of the wheels of the vehicle upon the ground. If the blow is at or near one end of the bar the end receiving it will yield most, the spring at the opposite end yielding in such manner as to permit the bar to turn slightly at that end, and also to aid in compensating lateral strain upon the wheels if the blow is oblique.

The principle of the invention is embodied in the buffer-bar and means provided for maintaining it in position in front of the vehicle wheels and affording the yielding movements specified of the bar, relatively to the vehicle when a shock or blow is given squarely or obliquely to the front and upon or against the bar as when in collision with a resisting body.

What I claim is:

1. In an apparatus of the class described, the combination with a pair of coil springs of a buffer-bar, a pair of attaching-pieces for securing the rear ends of the spring to the frame of the vehicle, and a pair of attaching-pieces for securing the buffer-bar to the front ends of the springs.

2. In an apparatus of the class described, the combination of a pair of coil springs having parts of the coiled bar at its ends extended from the coiled part in opposite directions, a buffer-bar rigidly connected with the extended parts of the coiled springs on one side of the coil, and means for rigidly attaching the extended parts of the coil springs on the opposite side to the frame of the vehicle.

3. In an apparatus of the class described, the combination with a pair of coil springs having integral parts extended from opposite sides, means for attaching the extensions on one side laterally rigid to the vehicle frame a buffer-bar provided with rearwardly curved ends, and means for attaching the buffer-bar to the extensions on the opposite side of the springs.

ANDREW P. OLSON.

Witnesses:
ROBERT VAN SANDS,
INGA E. OLSON.